(12) United States Patent
Grant (10) Patent No.: US 11,528,136 B2
(45) Date of Patent: Dec. 13, 2022

(54) DECRYPTION OF ENCRYPTED DATA MISSING A PRIVATE KEY

(71) Applicant: Crown Sterling Limited, LLC, Newport Beach, CA (US)

(72) Inventor: Robert Edward Grant, Laguna Beach, CA (US)

(73) Assignee: Crown Sterling Limited, LLC, Newport Beach, CA (US)

( * ) Notice: Subject to any disclaimer, the term of this patent is extended or adjusted under 35 U.S.C. 154(b) by 0 days.

(21) Appl. No.: 17/103,743

(22) Filed: Nov. 24, 2020

(65) Prior Publication Data

US 2022/0166618 A1 May 26, 2022

(51) Int. Cl.
*H04L 9/30* (2006.01)

(52) U.S. Cl.
CPC .................. *H04L 9/3033* (2013.01)

(58) Field of Classification Search
CPC ....... H04L 9/3033; H04L 9/0618; H04L 9/06; H04L 63/08; G06F 21/72
See application file for complete search history.

(56) References Cited

U.S. PATENT DOCUMENTS

| 5,966,445 A * | 10/1999 | Park ...................... H04L 9/3257 713/180 |
| 6,154,541 A | 11/2000 | Zhang |
| 6,396,928 B1 * | 5/2002 | Zheng .................. H04L 9/3247 380/285 |
| 6,480,605 B1 * | 11/2002 | Uchiyama ............. H04L 9/3013 380/259 |
| 6,990,200 B1 * | 1/2006 | Kasahara ............. H04N 7/1675 348/E7.056 |
| 7,502,754 B2 * | 3/2009 | Campbell ............... G06Q 30/04 380/255 |
| 8,468,244 B2 * | 6/2013 | Redlich ................ G06Q 10/107 709/225 |
| 10,911,451 B2 * | 2/2021 | Costa .................... G06F 21/602 |
| 2008/0208560 A1 | 8/2008 | Johnson |
| 2019/0036678 A1 | 1/2019 | Ahmed |

FOREIGN PATENT DOCUMENTS

| EP | 2680488 | 8/2019 |
| WO | 2016203762 | 12/2016 |

OTHER PUBLICATIONS

Grant, Robert E.; et al. "Accurate and Infinite Prime Prediction from Novel Quasi-Prime Analytical Methodology." Mar. 20, 2019. 8 pages.
Grant, Robert E.; et al. "Reciprocal Wave Factorization." Jun. 2020. 19 pages.

* cited by examiner

*Primary Examiner* — Hosuk Song
(74) *Attorney, Agent, or Firm* — Fish IP Law, LLP (57) ABSTRACT

A method for decrypting encrypted data/message whereby a computing device derives the prime numbers that are used to make up a public key by searching the decimals of the inverse of the quasi-prime number that is the public key. The computing devices designates a search range around a jump point of the decimals of the inverse of the public key and searches within the search range for prime numbers by testing them against the quasi-prime. When the prime numbers are found, the computing device then uses them to derive the private key and decrypt the data.

6 Claims, 11 Drawing Sheets

1/5767 =
0.0001734003814808392578463672620079764175481186058609328940523669152072134558
6960291312640887809953181897 (period 104)

Figure 4A $2^5(1/5767) =$
0.0887809953181897000173400381480839257846367262007976417548118605860932894052
3669152072134558696029131264 (period 104)

Figure 4B $2^{18}(1/5767) =$
45.4558696029131264088780995318189700017340038148083925784636726200797641754811
86058609328940523669152072133 (period 104)

Figure 4C

1/5767 =
0.0001734003814808392578463672620079764175481186058609328940523669152072134558
6960291312640887809953181897 (period 104)

DECRYPTION OF ENCRYPTED DATA MISSING A PRIVATE KEY

FIELD OF THE INVENTION

The field of the invention is data security in computer systems.

BACKGROUND

The background description includes information that may be useful in understanding the present invention. It is not an admission that any of the information provided herein is prior art or relevant to the presently claimed invention, or that any publication specifically or implicitly referenced is prior art.

Public key encryption schemes have been popular because they enable a recipient to be able to publicly distribute encryption keys for potential senders without compromising security. Rivest-Shamir-Adelman ("RSA") encryption in particular is based on the use of prime numbers to generate the keys. RSA encryption has been widely used as a reliable method of keeping information secure because of the prior difficulties in factoring for the prime numbers for very large keys.

However, a problem occurs if the owner of the data wishes to access encrypted data in situations where the private key has been lost or is otherwise unavailable.

For example, if a private key needed for decryption is kept in a computing device that is lost or destroyed, then any data that required that private key for decryption would have been lost to the user forever.

In another example, if a hacker gains access to a company's sensitive data, they could encrypt the data and then prevent access to the data until a ransom is paid because the company would have no way of undoing the encryption.

Thus, there is still a need for an ability to decrypt a message in an RSA or other encryption scheme using prime numbers in situations where the private key is lost.

SUMMARY OF THE INVENTION

The inventive subject matter provides apparatus, systems and methods in which a computing device is able to determine a private key in order to decrypt a message encrypted by a public key.

The computing device first obtains a message that has been encrypted with a public key. The public key is a quasi-prime number. The computing device then calculates an inverse of the public key.

Having the inverse of the public key, the computing device calculates a "jump" into the decimals of the inverse of the public key. This jump will designate a start position for the search for the prime factors of the quasi-prime number. The computing device then proceeds to determine a search range and a designated search length.

To find prime numbers within the designated search range, the computing device sequentially identifies blocks of digits that correspond to the search length along the search range. The computing device then divides the public key by the block of digits. If the result is an integer value, the computing device identifies that particular block of digits as a prime number. Having the first confirmed prime number of the public key, the computing device then identifies the result from the division in the previous step as the other prime number of the public key.

Having the prime numbers of the public key, the computing device can then derive the private key as the private key is also derived based on the prime numbers.

Having derived the private key, the computing device can proceed to decrypt the encrypted message.

In embodiments, the computing device can estimate a number of prime numbers expected within a particular period of digits and reduce a search range based on a narrowing function.

In embodiments, the computing device can rule out blocks of digits based on whether the block of digits ends in 0, 2, 4, 5, 6 or 8, or if the digital root is 3, 6 or 9.

In embodiments, the computing device can find the prime factors of the public key by executing geometric factorization on the quasi-prime public key.

Various objects, features, aspects and advantages of the inventive subject matter will become more apparent from the following detailed description of preferred embodiments, along with the accompanying drawing figures in which like numerals represent like components.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

The following description includes information that may be useful in understanding the present invention. It is not an admission that any of the information provided herein is prior art or relevant to the presently claimed invention, or that any publication specifically or implicitly referenced is prior art.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

BRIEF DESCRIPTION OF THE DRAWING

FIG. 12 is a flowchart illustrating the process to decrypt encrypted data by applying geometric factorization, according to embodiments of the inventive subject matter.

DETAILED DESCRIPTION

Throughout the following discussion, numerous references will be made regarding servers, services, interfaces, engines, modules, clients, peers, portals, platforms, or other systems formed from computing devices. It should be appreciated that the use of such terms, is deemed to represent one or more computing devices having at least one processor (e.g., ASIC, FPGA, DSP, x86, ARM, ColdFire, GPU, multi-core processors, etc.) programmed to execute software instructions stored on a computer readable tangible, non-transitory medium (e.g., hard drive, solid state drive, RAM, flash, ROM, etc.). For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be embodied as a computer program product comprising a non-transitory, tangible computer readable media storing the instructions that cause a processor to execute the disclosed steps. The various servers, systems, databases, or interfaces can exchange data using standardized protocols or algorithms, possibly based on HTTP, HTTPS, AES, public-private key exchanges, web service APIs, known financial transaction protocols, or other electronic information exchanging methods. Data exchanges can be conducted over a packet-switched network, the Internet, LAN, WAN, VPN, or other type of packet switched network.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Figure 1:
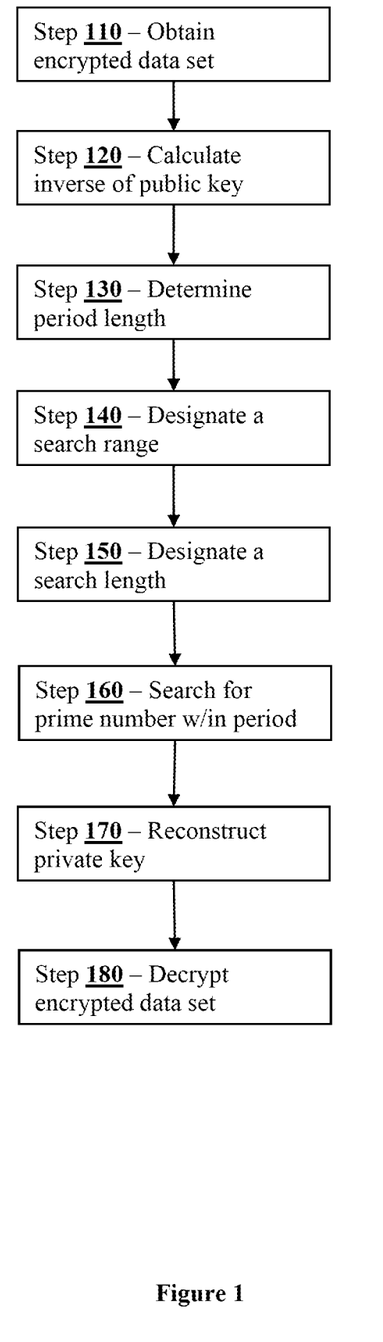
FIG. 1 is a flowchart providing an overview of the process executed by a computing device according to embodiments of the inventive subject matter.

FIG. 1 is a flow chart of a method of decrypting an encrypted data set without having the original private key, according to embodiments of the inventive subject matter.

At step 110, a computing device obtains an encrypted data set/information. The encrypted data set may have been already stored within the memory of the computing device or may have been received via a communication from another computing device in the form of an encrypted message. The encrypted data set has been previously encrypted by a public encryption key, which would require a corresponding private key to decrypt.

The public key used to encrypt the encrypted data set is a quasi-prime number. A quasi-prime number is a number that is a product of two prime numbers.

The computing device discussed herein can be any computing device that includes at least one processor and a non-transitory computer-readable storage medium that stores the computer-executable instructions to carry out the functions associated with the inventive subject matter. The computing device can also include a communications interface (e.g., cellular radio, modem, WiFi radio, etc.) that allow it to exchange data with other computing devices. The computing device can further include user interfaces that allow a user to interact with it (e.g., keyboard, mouse, monitor, touchscreen, stylus, microphone, etc.). Examples of suitable computing devices include, but are not limited to, desktop computers, laptop computers, tablets, server computers, smartphones, gaming consoles, and set-top boxes.

At step 120, the computing device calculates an inverse of the public key. The result will be a number with a periodic, never-ending decimal.

At step 130, the computing device "jumps" to a location within the decimal of the inverse of the public key. This "jump" is to a location where prime numbers are most likely to be found. The computing device performs the jump by multiplying the 1/x reciprocal equation (the inverse of the public key) by a binary expansion (i.e., $2^n$).

Thus, the jump calculation is produced by the following equation:

$$2^n(1/x)$$

Where "n" is the binary expansion exponent and x is the quasi-prime. This equation can alternatively be expressed as follows:

$$1/(2^{-n}x)$$

To determine the value for "n", the computing device starts with 1 or 2 and then tracks the time and or processing power required to find the prime numbers from the jump landing position. As the computing device executes the processes of the inventive subject matter repeatedly for different public keys, it will iteratively use increasing values for "n" and track the results, keeping track of the values for "n" that provide the fastest results in finding prime numbers. Over time, the computing device is then able to select from those values of "n" found to give the best results.

Figure 4A:
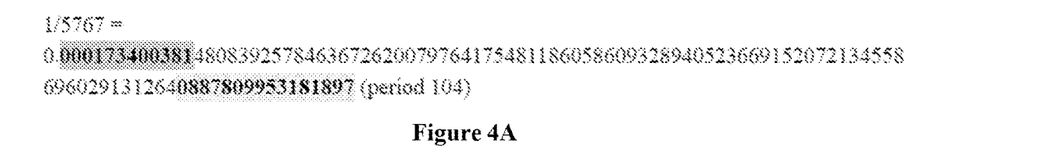
FIGS. 4A-4D illustrate a process for determining a jump into a decimal period, according to embodiments of the inventive subject matter.

For example, using the quasi-prime number 5767 for "x", whose prime factors are 73 and 79, whose reciprocal repeating decimal period is shown in FIG. 4A. The highlighted numbers show the beginning and end of the decimal period.

Figure 4B:
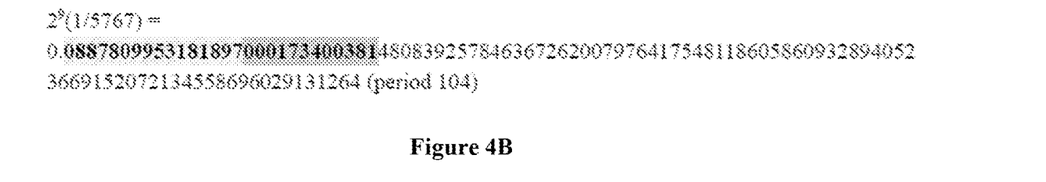

Next, the computing device applies the binary expansion component n=9, as seen in FIG. 4B. This "jumps" to digit 90 of a 104-digit period, an approximate 86.5% jump through the sequence. The highlight in FIG. 4B shows the beginning of the jump sequence and where it loops back to the beginning of the period.

Figure 4C:
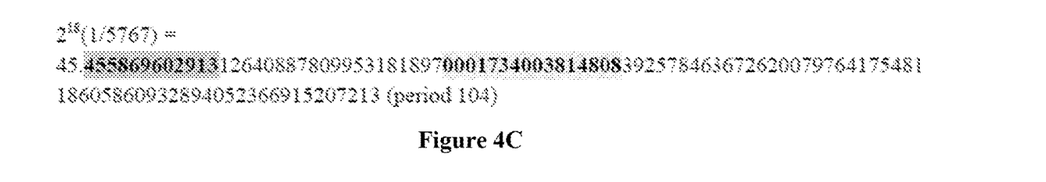
Figure 4D:
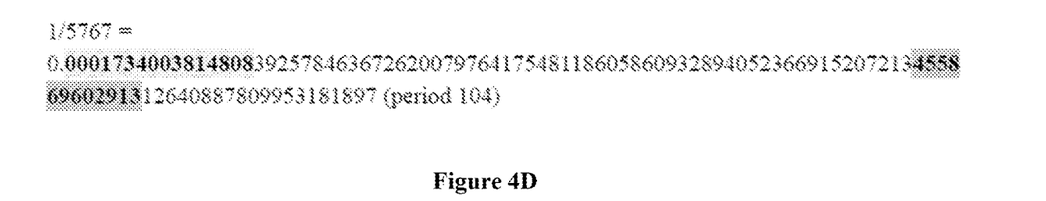

Continuing with this example, FIG. 4C shows the computing device applying a binary expansion component of n=18. In FIG. 4C, the sequence begins after the decimal in the sequence of FIG. 4A and jumps just over halfway through the sequence. This is shown in FIG. 4D, which shows the sequence of FIG. 4A with the number sequence of FIG. 4C highlighted to show the effect of the jump.

Some exponents (n) do not result in a jump, but in each semi-prime there are a sequence of binary expansions which jump to different positions in the period. These position jumps are generally repetitive with a slight offset, so after a sequence of jump positions the pattern will repeat and move slightly further into the period pattern.

For example:

For a specific $2^n(1/x)$, the computing device can find the initial jumps according to the following:

$2^4(1/x)$»20% jump, $2^6(1/x)$»40% jump, $2^8(1/x)$»60% jump, $2^{10}(1/x)$»80% jump Then the computing device is also able to find the following repeated jump wave with offsets:

$2^{16}(1/x)$»21% jump, $2^{18}(1/x)$»41% jump, $2^{20}(1/x)$»61% jump, $2^{22}(1/x)$»81% jump Following these initial jump calculations, which we designated as "negative binary expansion exponents" (since $2^n = \frac{1}{2}^{-n}$), we applied a modified form of the equation to create effective jump sequences using "positive binary expansion exponents" within larger quasi-prime decimal periods: $1/(2^n x)$ where n is now a positive binary expansion exponent and x is still the semi-prime. However, it is noted that negative binary expansion exponents can also be used to generate successful jumps. They exhibit identical properties as the positive binary expansion exponents.

This has significant implications for the acceleration of locating prime factors in a large decimal period sequence. Instead of having to calculate thousands of decimal digits leading up to the location of a prime factor, these digits can be effectively skipped, landing the calculation closer to, or potentially directly on, the prime factor itself. Rather than the massive brute force calculations of either testing every possible prime of the correct length to find the factor of a large semi-prime or testing every digit combination in the reciprocal in sequence to find the prime factor, this approach creates the possibility of jumping directly to the prime factor with extremely low to negligible processing time.

This process is also discussed, along with illustrative examples, in Applicant's paper titled "Reciprocal Wave Factorization" (incorporated herein by reference in its entirety).

At step 140, the computing device designates a search range around the jump landing point. The search range can be designated by the computing device or by a user. It can be determined based on the length of the public key, based on a predicted amount of prime numbers for a particular "jump", or other factors.

At step 150, the computing device designates a search length. The search length sets forth the size of the prime numbers that will be searched for. Thus, a search length of "4" corresponds to searching for prime numbers that are four digits long. Likewise, a search length of "5" corresponds to searching for prime numbers that are five digits long, etc.

At step 160, the computing device proceeds to search for the prime numbers within a period of the inverse of the public key.

At step 170, once the prime numbers have been found, the computing device reconstructs the private key corresponding to the public key.

At step 180, the computing device uses the private key to decrypt the encrypted data set.

Figure 2:
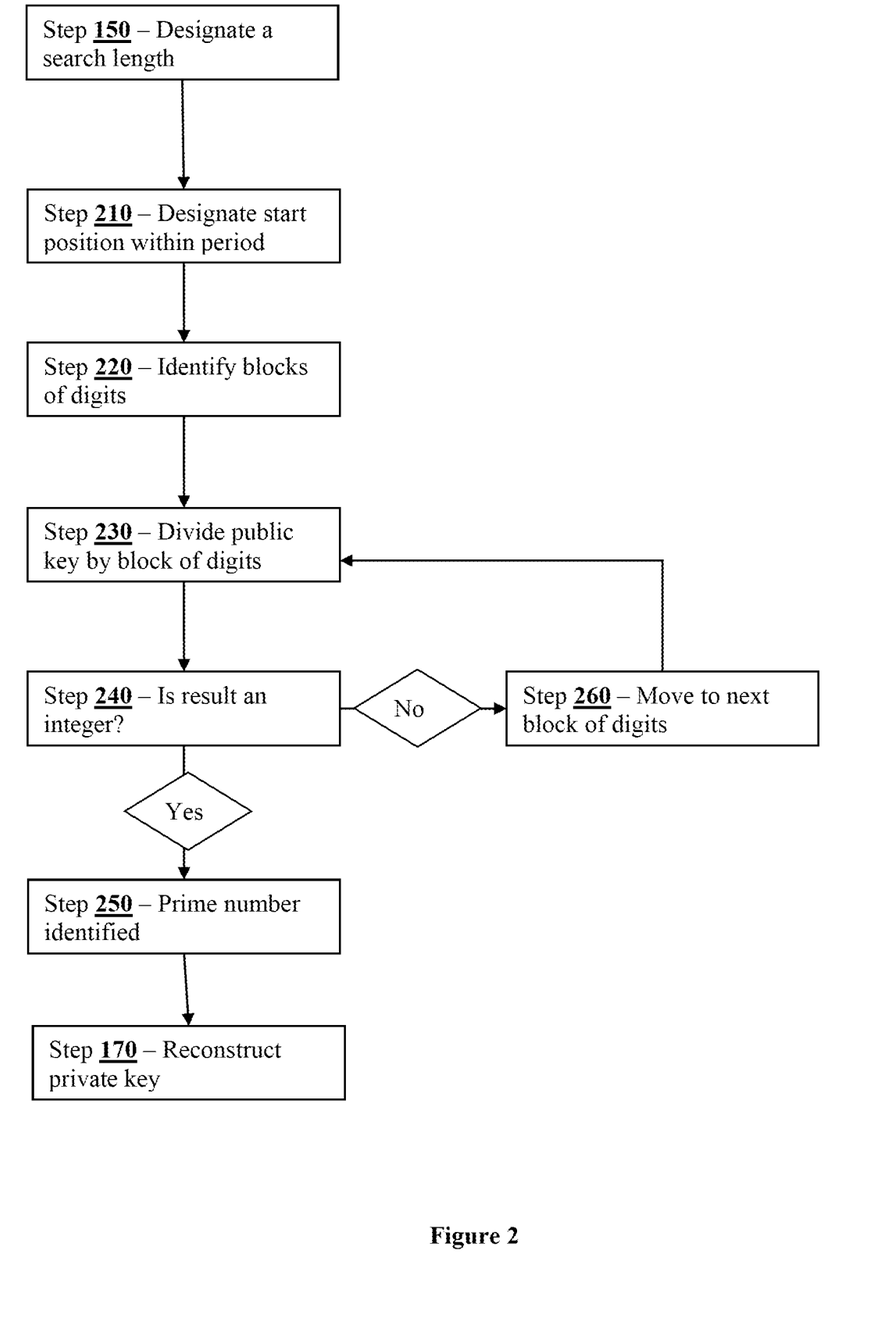
FIG. 2 is a flowchart illustrating the process of searching for prime numbers in greater detail, according to embodiments of the inventive subject matter.

In embodiments of the inventive subject matter, the search for the prime numbers within a period of the inverse of the public key of step 160 is conducted as illustrated in the flowchart of FIG. 2.

At step 210, the computing device designates a start position within the identified period. In embodiments, the start position can simply be at the beginning of the period.

At step 220, the computing device begins identifying, from the starting point, blocks of digits that correspond to the search length. For example, if the designated search is four digits, then the computing device identifies four-digit-long blocks.

Figure 3A:
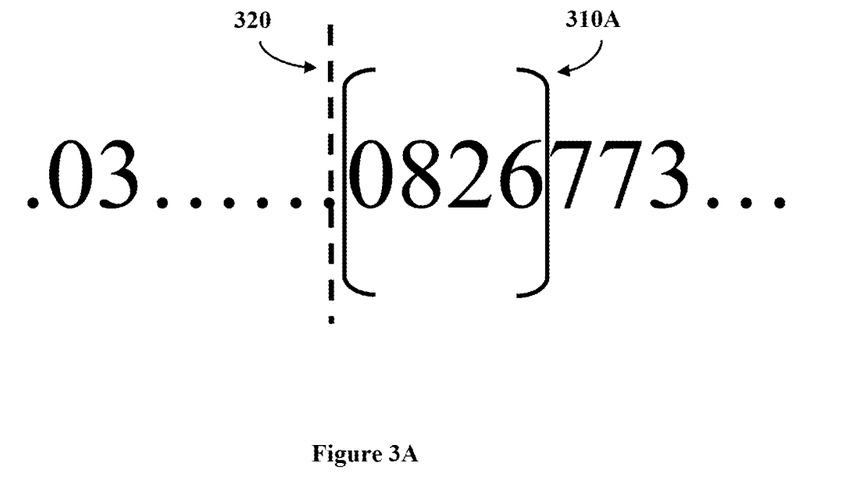
FIGS. 3A and 3B provide an illustrative example of the progression of blocks of digits along a search range, according to embodiments of the inventive subject matter.

FIG. 3A provides an illustrative example of a block of digits 310A that is identified by the computing device at step 220. As seen in FIG. 3A, the block of digits 310A (illustrated via the brackets) is located at the start of the period (illustrated by dashed line 320). In this example, the starting point corresponds to the beginning of the period 320.

At step 230, the computing device divides the public key by the identified block of digits.

At step 240, the computing device determines whether the result of step 230 is an integer. If it is an integer, then the computing device proceeds to step 250 because this means that the identified block of digits is a prime number. Also, at this step, the result is the other prime number that is multiplied together with the prime number in the block of digits to produce the public key. After step 250, the process then returns to step 170 of FIG. 1.

If the result of step 240 is not an integer, it means the identified block of digits is not a prime number. In this situation, the computing device then moves to the next block of digits in the period at step 260 and the process returns to step 230 to be applied to the next block of digits. The computing device repeats this process for the period until a prime number is found.

Figure 3B:
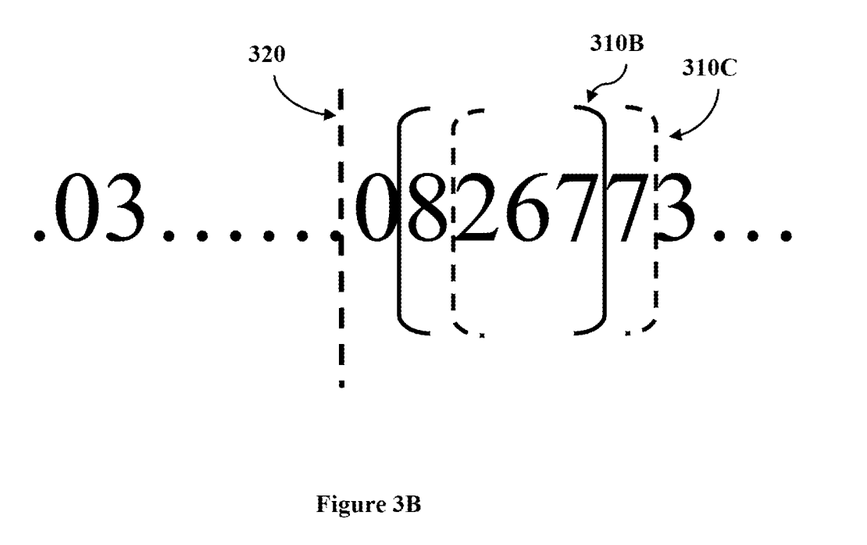

The progression to the next block of digits at step 260 is illustrated in FIG. 3B. As seen in FIG. 3B, the computing device has moved on to the next block of digits 310B (shown via the brackets in FIG. 3B), which in this case is sequentially one digit to the right of the initial block of digits 310A of FIG. 3A. Each time the process is executed and a prime number is not located, the computing device moves on to the next block of digits. Thus, if the block of digits 310B were found not to be a prime number, the computing device would then move on to block of digits 310C (shown by the dashed brackets in FIG. 3B), and so on.

In embodiments of the inventive subject matter, the computing device is programmed to further reduce the time required to find the prime numbers. In these embodiments, following step 220 (for the initial block of digits) and step 260 (for subsequent blocks of digit), the computing device checks to see whether the last digit of the block of digits is a 1, 3, 7, or 9 and the digital root is not equal to 3, 6 or 9. If the digit of the block of digits is not 1, 3, 7, or 9 (i.e., is zero, 2, 4, 5, 6, or 8) or the digital root equals 3, 6 or 9, the computing device skips to the next block of digits without performing further calculations. Because a prime number cannot end in zero, 2, 4, 5, 6 or 8 or have a digital root of 3, 6 or 9, the computing device saves processing resources by simply skipping to the next block of digits in these situations. In these embodiments, in the example of FIGS. 3A and 3B, the computing device would determine that the four-digit number "0826" of block 310A in FIG. 3A does not end in 1, 3, 7, or 9 and then move on to block 310B of FIG. 3B without taking the step of dividing the public key by the number of block 310A.

In addition to the steps discussed above, the systems of the inventive subject matter can further speed up the process by checking whether a particular potential prime number is found within a Q-prime grid.

A Q-prime grid is a table or grid formed by numbers contained in the prime moduli. A detailed explanation of the generation of the Q-prime grid based on the prime moduli is provided in the inventor's paper titled "Accurate and Infinite Prime Prediction from Novel Quasi-Prime Analytical Methodology", incorporated by reference in its entirety. If the potential prime number is within the Q-prime grid, it is not a prime number. If it is not within the Q-prime grid, then it is a prime number by definition.

If, at the end of the search range (either the full period or the reduced search range, depending on the embodiment), the computing device does not identify any prime numbers, it is programmed to change the search length and restart the process. Thus, for example, if no prime numbers are found for a search length of four digits, the computing device changes the search length to conduct the analysis for a search length of five digits or three digits. Thus, if no prime numbers are found for a particular search length, the process returns back to step 150 and selects a different search length.

In embodiments, the computing device is programmed to change the search range if no prime numbers are identified during the process. For example, if the process is executed according to the embodiments of FIG. 4 (with a reduced search range) and no prime numbers are located, the computing device is programmed to change the search range. Typically, the search range will be increased so that a greater amount of the period will be searched. It should be noted that the search range will not be extended beyond the period length because it would result in searching a repeating section of the decimals of inverse of the public key.

In the embodiments discussed herein, a single block of digits is employed in searching through the search range (as seen in FIGS. 3A-3B). It is contemplated that, in embodiments, a multi-threaded approach can be taken whereby multiple blocks of digits are employed. For example, two blocks of digits could be used, each starting at a corresponding end of the search range and working inward. Conversely, two blocks of digits could be used starting "back to back" at the middle of the search range and working outward towards the boundaries. In other embodiments, more than two blocks of digits can be employed.

In another embodiment of the inventive subject matter, the computing device locates prime numbers by executing geometric factorization. FIGS. 5-9 illustrate the process of finding the prime factors of a quasi-prime number using this process. In the illustrative example, the computing device is finding the factors of the number 1,891.

Figure 5:
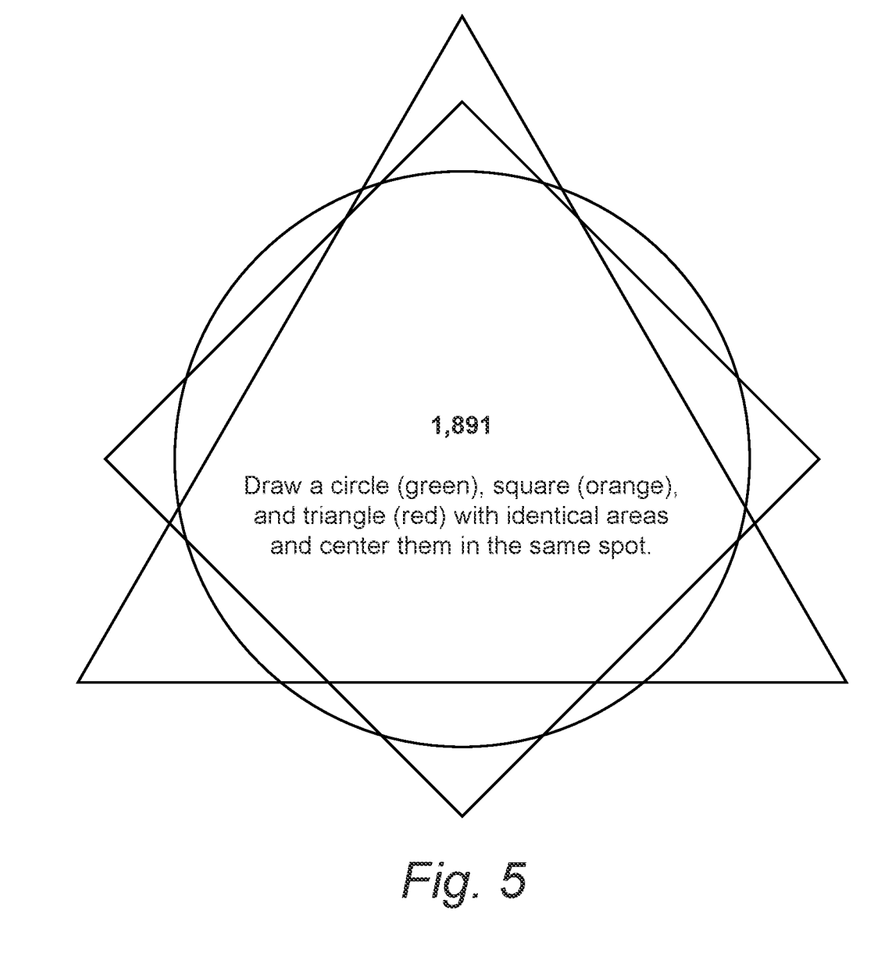
FIGS. 5-11 illustrate a process implementing geometric factorization to find the prime factors of a quasi-prime number, according to embodiments of the inventive subject matter.

The first step of the process is shown on FIG. 5, where the computing device draws a circle, square, and triangle with identical areas and centers them about the same spot.

Figure 6:
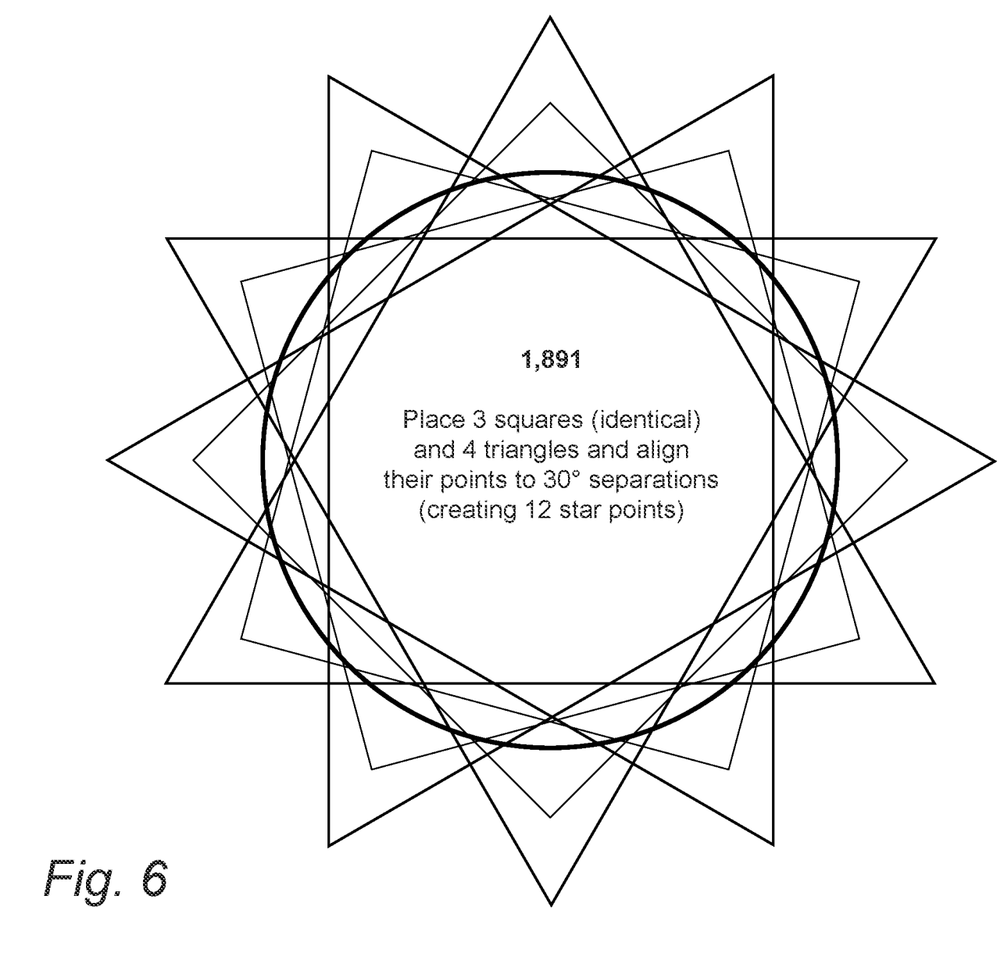
Figure 7:
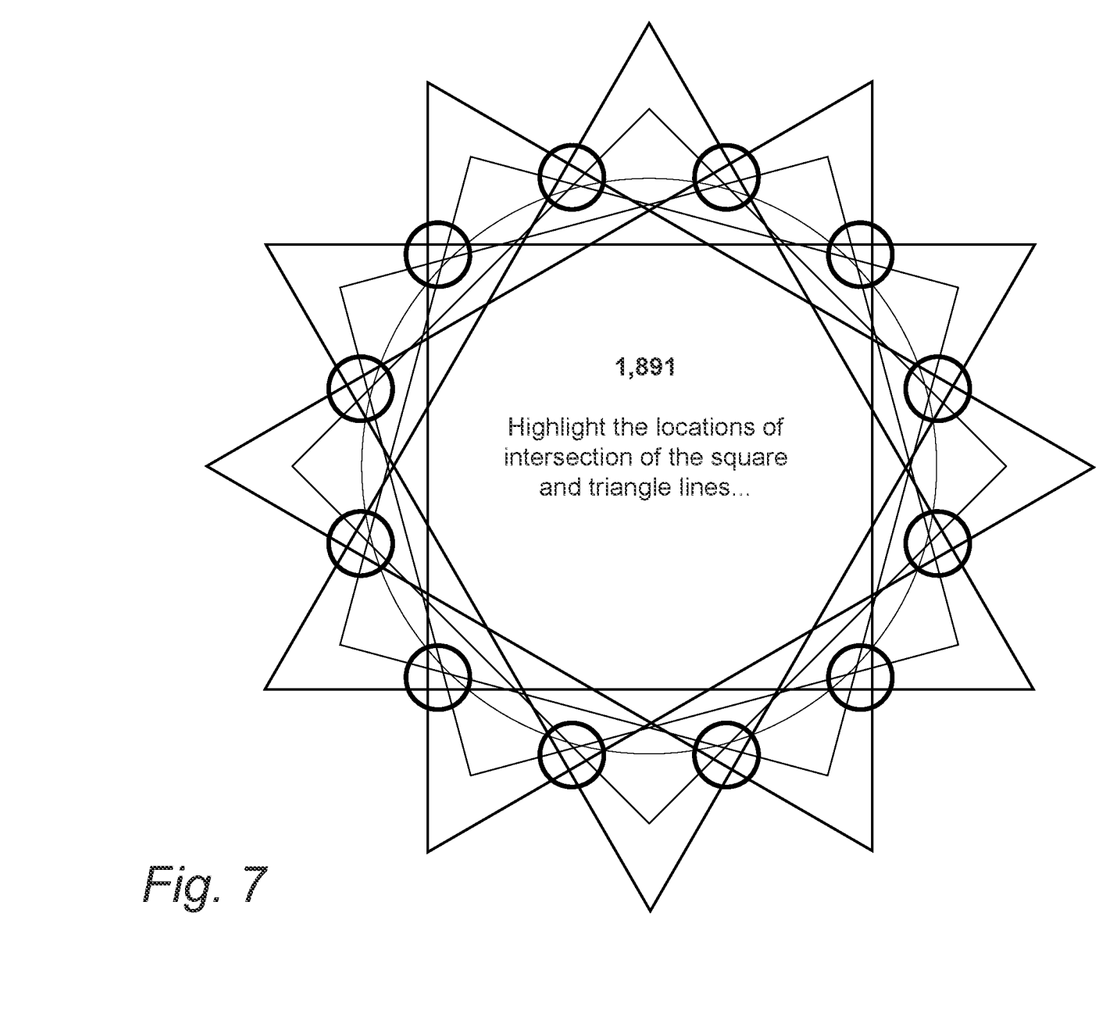

As seen in FIG. 6, the computing device then draws three additional identical squares and four additional identical triangles, separating their points by 30 degrees. This results in 12 star points. In FIG. 7, the computing device then identifies the locations of intersection of the lines of the squares and triangles as seen in the circles.

Figure 8:
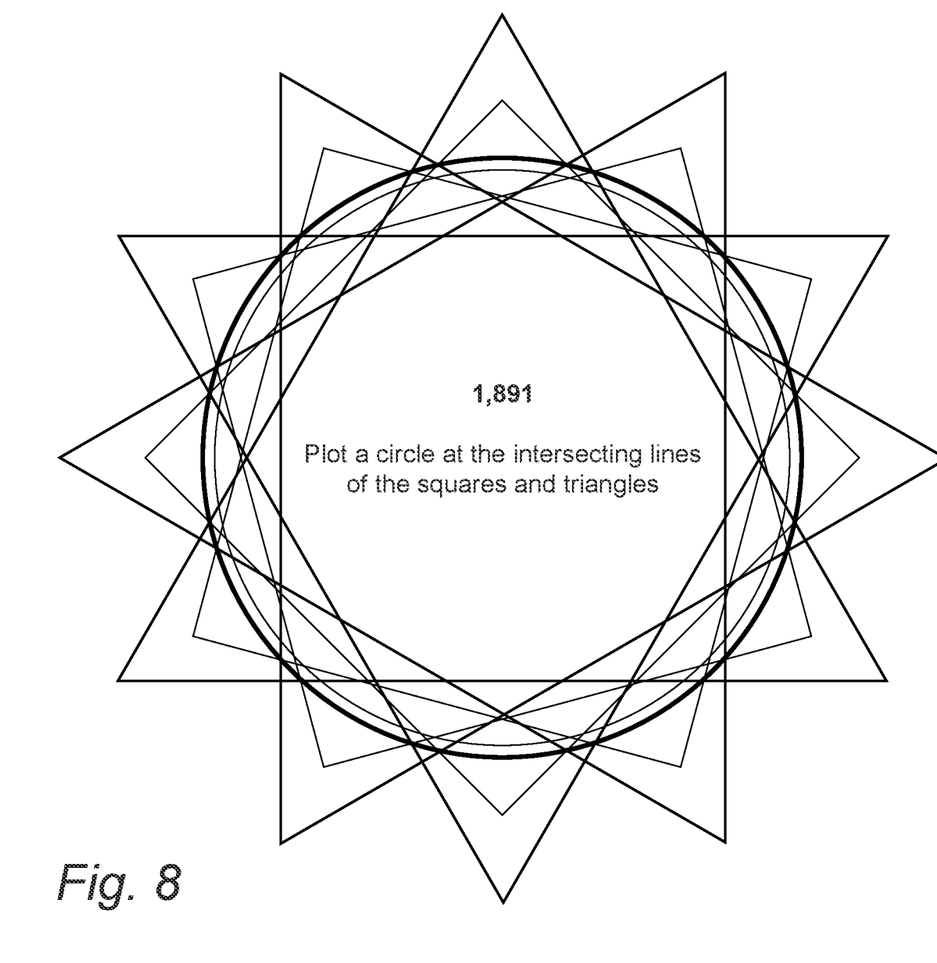
Figure 9:
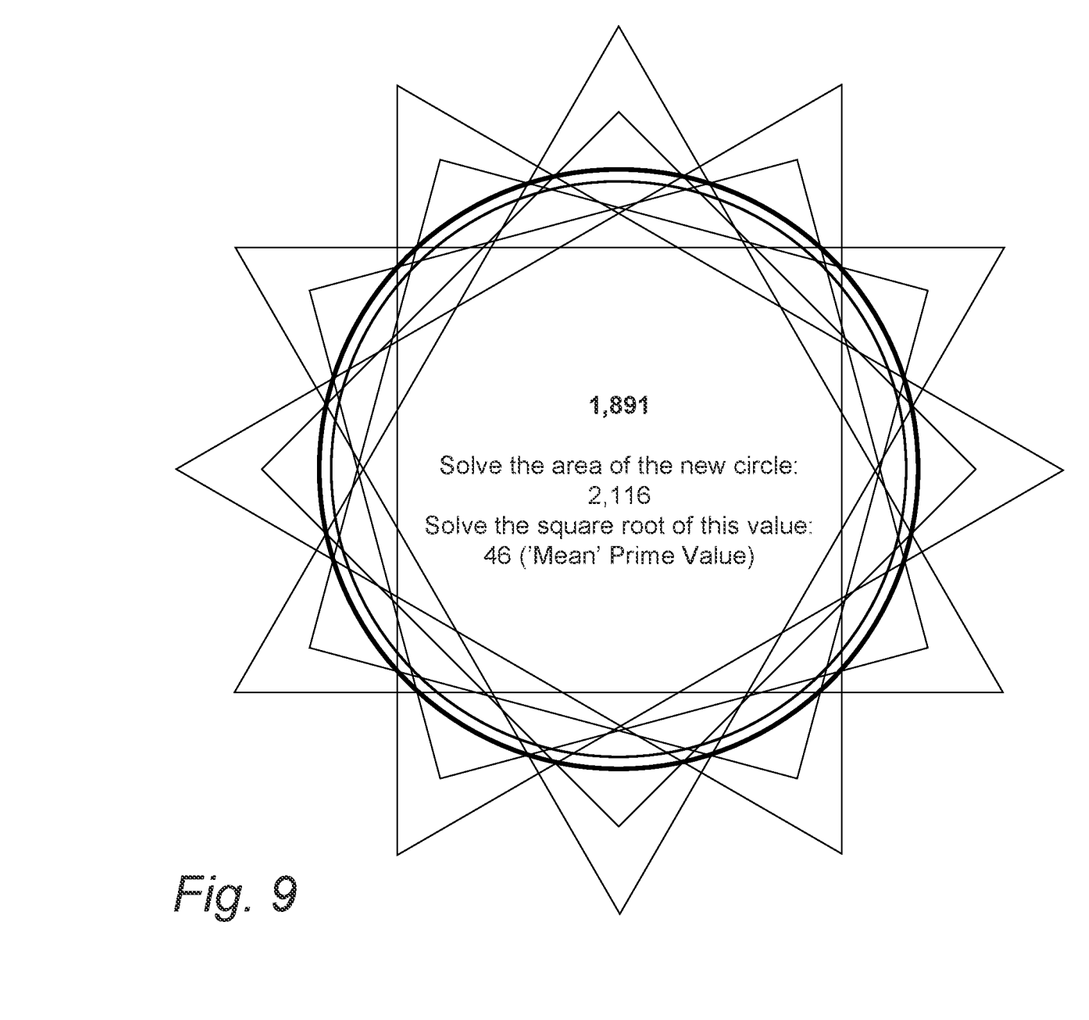

The computing device then plots a circle that passes through these intersection points, as seen in FIG. 8. At the step of FIG. 9, the computing device solves for the area of the newly-drawn circle and solves for the square root of the area value. This value is called the "Mean". In this case, the value of the Mean is 46.

Figure 10:
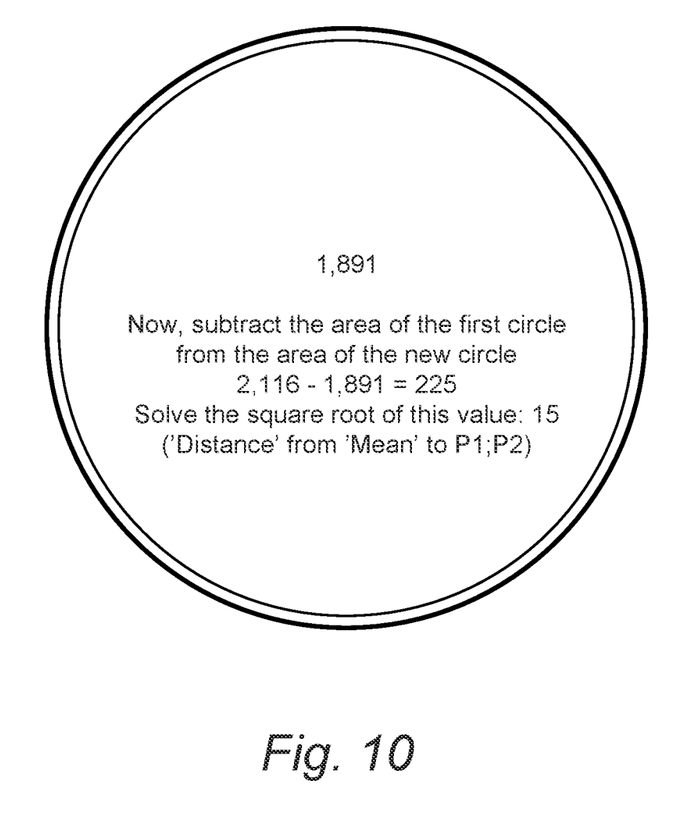

In the next step, seen in FIG. 10, the computing device subtracts the area of the circle drawn in FIG. 5 from the circle drawn in FIG. 8. In this example, it is 2,116 minus 1,891, which equals 225. The computing device then takes the square root of this value to find the "Distance", which is 15.

Figure 11:
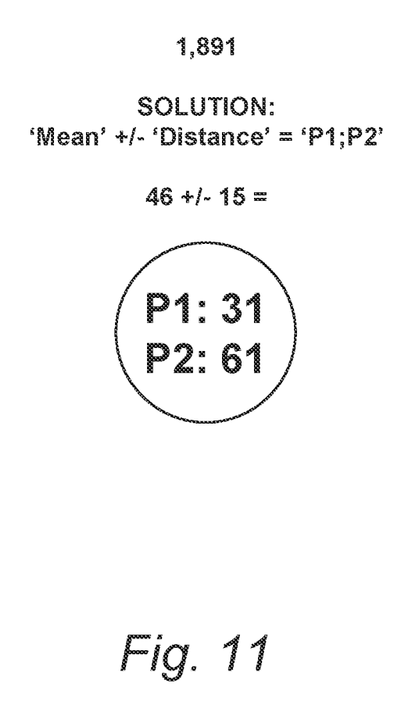

FIG. 11 shows how to find the solution for the prime number factors of the quasi-prime. As seen in FIG. 11, the solution is the Mean plus/minus the Distance. In this example, it is 46+15 and 46−15, which results in 31 and 61. 31 and 61 are the prime number factors of the quasi-prime number 1,891.

FIG. 12 is a flowchart of the method of decrypting an encrypted message that incorporates the process of FIGS. 5-11.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of decrypting a message encrypted by a cryptographic key, comprising:

obtaining, by a computing device, an encrypted message wherein the message was encrypted by a public key;

calculating, by the computing device, an inverse of the public key, wherein the public key is a quasi-prime number;

calculating, by the computing device a jump point within the inverse of the public key, wherein the jump point is a function of a reciprocal equation and a binary expression;

determining, by the computing device, a search range around the calculated jump point;

selecting, by the computing device, a designated search length;

locating, by the computing device, at least one prime number within the search range, by:
  from a starting point within the search range, sequentially identifying blocks of digits along the search range corresponding to the designated search length;
  for each block of digits, dividing the public key by the block of digits; and
  designating a particular block of digits from the identified blocks of digits as a prime number if the division of the public key by the respective block of digits returns an integer value for an answer;

determining, by the computing device, a second prime number based on the public key value and the designated prime number;

determining, by the computing device, a private key corresponding to the public key value based on the designated prime number and the second prime number; and decrypting, by the computing device, the encrypted message using the private key.

2. The method of claim 1, wherein the step of sequentially identifying blocks of digits further comprises:
  for each identified block of digits, determining, by the computing device, whether the block of digits ends in 0, 2, 4, 5, 6 or 8; and
  for each block of digits determined to end in 0, 2, 4, 5, 6 or 8, skipping, by the computing device, to the next block of digits in the sequence.

3. The method of claim 1, further comprising:
  from a second starting point within the second search range, sequentially identifying additional blocks of digits along the search range corresponding to the search length simultaneously with the blocks of digits;
  for each block of digits, dividing the public key by the block of digits; and
  designating a particular block of digits from the additional blocks of digits as a prime number if the division of the public key by the respective block of digits returns an integer value for an answer.

4. The method of claim 1, further comprising, upon reaching an end of the search range without locating the at least one prime number:
  selecting a second designated search length; and
  locating the at least one prime number within the second designated search range by:
    from a starting point within the second designated search range, sequentially identifying additional blocks of digits along the search range corresponding to the second search length;
    for each block of digits, dividing the public key by the block of digits; and
    designating a particular block of digits from the sequentially identified additional blocks of digits as a prime number if the division of the public key by the respective block of digits returns an integer value for an answer.

5. The method of claim 1, further comprising, upon reaching an end of the search range without locating the at least one prime number:
  determining, by the computing device, a second search range; and
  locating, by the computing device, at least one prime number within the second search range, by:
    from a starting point within the second search range, sequentially identifying additional blocks of digits along the second search range corresponding to the search length;
    for each block of digits, dividing the public key by the block of digits; and
    designating a particular block of digits from the sequentially identified additional blocks of digits as a prime number if the division of the public key by the respective block of digits returns an integer value for an answer.

6. The method of claim 1, further comprising, for each of the blocks of digits:
  calculating a digital root for the particular block of digits; and
  in response to the digital root equaling 3, 6 or 9, proceeding to the next block of digits in the sequence.

* * * * *

UNITED STATES PATENT AND TRADEMARK OFFICE
CERTIFICATE OF CORRECTION

| | |
|---|---|
| PATENT NO. | : 11,528,136 B2 |
| APPLICATION NO. | : 17/103743 |
| DATED | : December 13, 2022 |
| INVENTOR(S) | : Robert Edward Grant |

It is certified that error appears in the above-identified patent and that said Letters Patent is hereby corrected as shown below:

In the Claims

Column 9, Line 41, Claim 3, change "from a second starting point within the second search" to --from a second starting point within the search--

Column 9, Line 45, Claim 3, change "for each block of digits," to --for each of the additional block of digits,--

Signed and Sealed this
Seventeenth Day of October, 2023

*Katherine Kelly Vidal*

Katherine Kelly Vidal
*Director of the United States Patent and Trademark Office*